United States Patent [19]

Petersen et al.

[11] Patent Number: 5,496,096
[45] Date of Patent: Mar. 5, 1996

[54] METHOD OF AND AN APPARATUS FOR REGULATING AN ELECTRICALLY REGULATED BRAKE CIRCUIT OF A MULTI-CIRCUIT BRAKE MECHANISM

[75] Inventors: Erwin Petersen, Wunstorf; Manfred Schult, Garbsen, both of Germany

[73] Assignee: WABCO Westinghouse Fahrzeugbremsen GmbH, Hanover, Germany

[21] Appl. No.: 447,499

[22] Filed: Dec. 7, 1989

[30] Foreign Application Priority Data

Dec. 12, 1988 [DE] Germany .......................... 38 41 750.2

[51] Int. Cl.[6] ..................................................... B60T 8/26
[52] U.S. Cl. .............................................. 303/3; 303/15
[58] Field of Search ............................... 303/3, 15, 16, 303/17, 20, 118, 113 R, 113.1, 100

[56] References Cited

U.S. PATENT DOCUMENTS

| | | |
|---|---|---|
| 2,818,943 | 1/1958 | Coward . |
| 3,944,287 | 3/1976 | Nagase ........................................ 303/3 |
| 4,428,620 | 1/1984 | Warwick et al. ........................... 303/3 |
| 4,624,506 | 11/1986 | Doto ............................................ 303/3 |
| 4,799,740 | 1/1989 | Iwaizako et al. ........................... 303/3 |

FOREIGN PATENT DOCUMENTS

| | | |
|---|---|---|
| 0088911 | 2/1983 | European Pat. Off. . |
| 2218315 | 10/1972 | Germany . |
| 2363636 | 6/1974 | Germany . |
| 3344252 | 6/1984 | Germany . |
| 3239970 | 7/1984 | Germany . |
| 3312981 | 10/1984 | Germany . |
| 3345694 | 6/1985 | Germany . |
| 3502049 | 7/1986 | Germany . |
| 3617356 | 11/1987 | Germany ................................... 303/3 |
| 3639065 | 5/1988 | Germany . |
| 509909 | 3/1971 | Switzerland . |
| 2196074 | 4/1988 | United Kingdom . |

*Primary Examiner*—Matthew C. Graham
*Attorney, Agent, or Firm*—Meltzer, Lippe & Goldstein, et al.

[57] ABSTRACT

This invention provides a method of and an apparatus for regulating an electrically regulated brake circuit of a multi-circuit brake mechanism. To eliminate the cost of brake pressure modulators, this invention measures the brake value of a pressure signal regulated brake circuit and transforms it into an electric brake value signal to regulate or co-regulate the electrically regulated brake circuit in a normal mode of operation by this brake value signal.

36 Claims, 2 Drawing Sheets

5,496,096

METHOD OF AND AN APPARATUS FOR REGULATING AN ELECTRICALLY REGULATED BRAKE CIRCUIT OF A MULTI-CIRCUIT BRAKE MECHANISM

FIELD OF THE INVENTION

The present invention relates, in general, to electrically regulated multi-circuit brake equipment and, more particularly, this invention relates to a method of and an apparatus for regulating at least one electrically regulated brake circuit of a multi-circuit brake mechanism having a plurality of brake cylinders actuated by a fluid pressure medium.

BACKGROUND OF THE INVENTION

Prior to the present invention, equipment for regulating electrically regulated brake circuits of a multi-circuit brake mechanism and methods of operating such brake circuits have been taught in the prior art. One such method and braking system is taught, for example, in FIG. 2 of EP-B-0 088 911. In this prior art publication, each of the brake circuits is capable of being regulated electrically as well as by fluid pressure signals. In this prior art system, these pressure signals are communicated to relay values 30, 31, 37, and 38. Because a brake pressure modulator used in this system is a rather expensive device, as a result of its complexity, the disclosed brake circuits are also more expensive. This is particularly the case because at least two such brake pressure modulators are required for the brake circuits in this system.

In a multi-circuit brake mechanism consisting of at least one electrically regulated brake circuit and at least one brake circuit that is regulated by the pressure signal, as taught in the prior art, the disadvantage exists that the pressure buildup of the electrically regulated brake circuit generally will lead the pressure buildup of the fluid pressure regulated brake circuit. This undesirable condition normally will result in a nonuniform wear of the brake linings of a vehicle or, in the case of a vehicle combination, of another vehicle. Obviously, this adds to the maintenance cost on such vehicle or vehicle combination. Such vehicle combination, for example, being a tractor-trailer combination.

SUMMARY OF THE INVENTION

The present invention provides a method of and an apparatus for regulating at least one electrically regulated brake circuit of a multi-circuit brake mechanism having fluid pressure medium activated brakes. According to the present invention, the multi-circuit brake mechanism includes a brake activation device. Such brake activation device is arranged to at least issue a first electric brake value signal and at least a pressure signal. In this arrangement, the brake activation device is configured such that the magnitudes of the first electric brake value signal and of the pressure signal depend upon the supplied activation force and/or the travel distance of the activation lever. As used herein, the term "brake value" is a quantity that characterizes the instantaneous burdening of the brakes of an associated brake circuit. Such characteristics may include brake pressure, brake moment, brake temperature, etc. The multi-circuit brake mechanism also includes at least one electrically regulated brake circuit that is activated by the first electric brake value signal and one brake circuit that is regulated by the pressure signal. The brake value of the pressure signal regulated brake circuit being measured and the measured brake value then being transformed to a second electric brake value signal. In the invented method and apparatus, the electrically regulated brake circuit is at least co-regulated in a normal mode of operation by the second electric brake value signal and in an exceptional mode of operation by the first electric brake value signal.

OBJECTS OF THE INVENTION

It is, therefore, one of the primary objects of the present invention to provide a method of and an apparatus for regulating an electrically regulated brake circuit of a multi-circuit brake mechanism which, by relatively simple means, such method and apparatus can be implemented at a lower cost than with prior art brake mechanisms.

Another object of the present invention is to provide a method of and an apparatus for regulating an electrically regulated brake circuit of a multi-circuit brake mechanism which can be used in conjunction with any suitable fluid pressure medium normally used in either hydraulic or pneumatic brake systems.

Still another object of the present invention is to provide a method of and an apparatus for regulating an electrically regulated brake circuit of a multi-circuit brake mechanism which will provide a more uniform wear of the brake linings thereby lowering the associated maintenance cost.

A further object of the present invention is to provide a method of and an apparatus for regulating an electrically regulated brake circuit of a multi-circuit brake mechanism in which the pressure signal of the brake circuit that is regulated by the pressure signal can be supplied directly to the brakes as braking pressure in the event of an electrical malfunction in the brake system.

An additional object of the present invention is to provide a method of and an apparatus for regulating an electrically regulated brake circuit of a multi-circuit brake mechanism which will enable the use of a conventional relay valve in place of one or more pressure modulators to achieve a more cost effective approach in obtaining a decrease in response time of the brake system.

Yet another object of the present invention is to provide a method of and an apparatus for regulating an electrically regulated brake circuit of a multi-circuit brake mechanism which enables the performance of a relatively simple test of the characteristics and functions of a generator of a second electric brake value signal or of the electrical portion of the brake activating mechanism by comparing a first electric brake value signal generated by it with such second electric brake value signal.

It is an additional object of the present invention to provide a method of and an apparatus for regulating an electrically regulated brake circuit of a multi-circuit brake mechanism which is capable of compensating for flaws which may be present in the characteristics of the function or disturbance of the generator or of the electrical portion of the brake activating mechanism.

Still yet another object of the present invention is to provide a method of and an apparatus for regulating an electrically regulated brake circuit of a multi-circuit brake mechanism which is capable of taking into consideration the loading characteristic on a vehicle during the braking process, thereby providing the possibility of increased safety.

In addition to the above-described objects and advantages of the method of and an apparatus for regulating an electrically regulated brake circuit of a multi-circuit brake mechanism, various other objects and advantages of the present invention will become more readily apparent to those persons who are skilled in the vehicle braking art from the following more detailed description of the invention, particularly when such description is taken in conjunction with the attached drawings and with the appended claims.

BRIEF DESCRIPTION OF THE INVENTION

Figure 1:
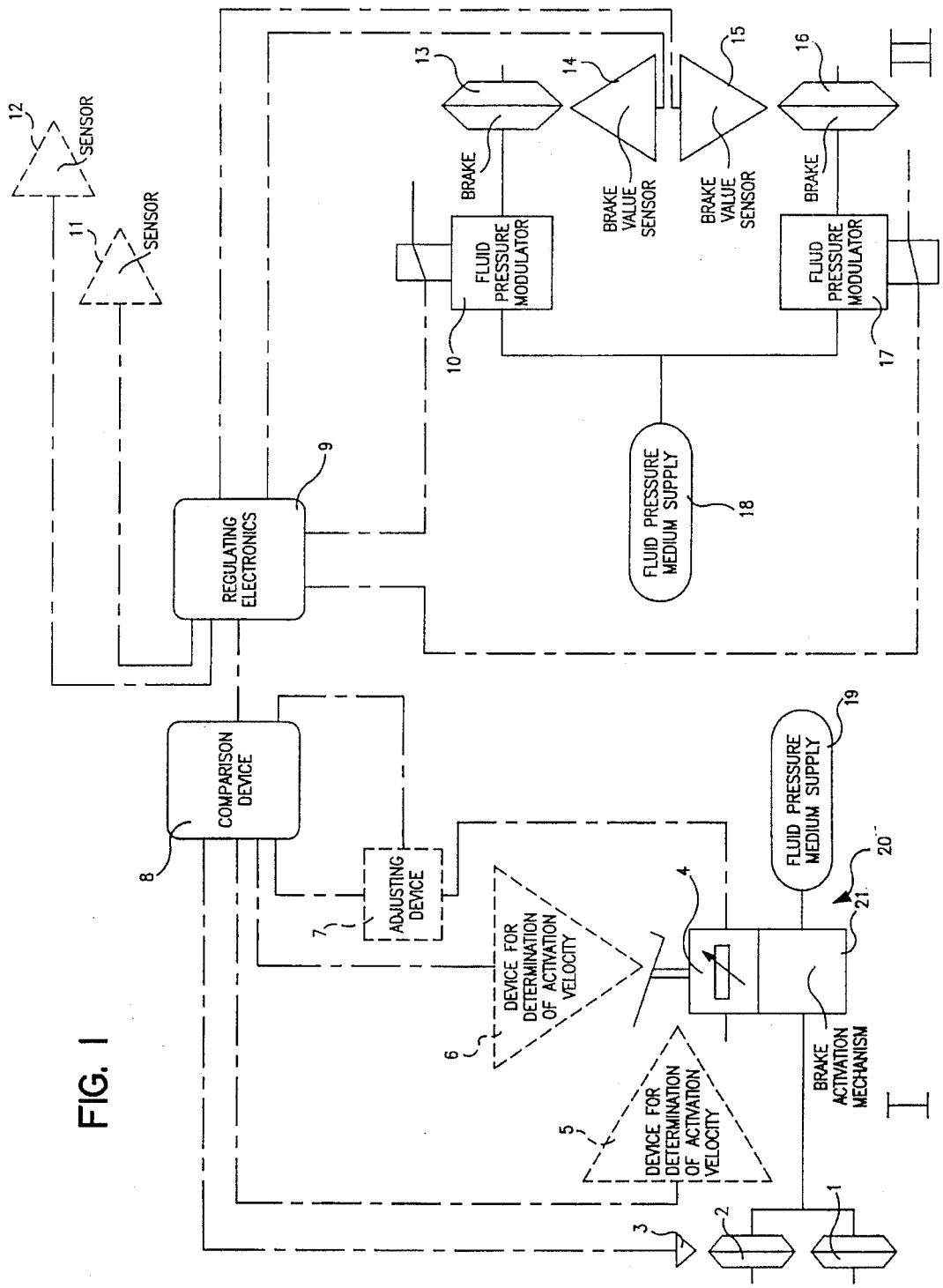
FIG. 1 is a schematic diagram which illustrates one presently preferred embodiment of a multi-circuit brake mechanism assembled according to the present invention.

Prior to proceeding to the more detailed description of the present invention, it should be noted that in each of the views illustrating such invention there are identical components which have identical functions and, therefore, have been identified with identical reference numerals.

It should likewise be noted that solid lines have been used in each of the drawing figures to designate the fluid pressure medium connecting lines, and dash-dotted lines have been used in each of the drawing figures to designate the required electrical connections.

Now refer more particularly to FIG. 1. Illustrated therein is a multi-circuit brake mechanism which includes a pressure signal regulated brake circuit and an electrically regulated brake circuit, which brake circuits, in general, are identified as I and II, respectively.

The multi-circuit brake mechanism of this invention includes a brake activation mechanism generally designated 20. The electric portion 4 of such brake activation mechanism issues a first electric brake signal and the fluid pressure medium portion 21 thereof issues a pressure signal. The magnitude of such first electric brake signal and such pressure signal will depend, in a known manner, on the activation force that is supplied to the brake activation mechanism 20 and/or on its activation travel distance.

The electric portion 4 and the fluid pressure medium portion 21 are coupled by an appropriate arrangement of the inner components so that the first electric brake value signal, in the case of an intact pressure signal regulated brake circuit I, is generated by the pressure at the outlet of the fluid pressure medium portion 21 and, in case of a defective pressure signal regulated brake circuit I, it is generated directly.

The pressure signal regulated brake circuit I consists of a fluid pressure medium supply 19, a fluid pressure medium portion 21 of the brake activation mechanism 20, and fluid pressure medium activated brakes 1 and 2. The pressure signal is generated by the brake activation mechanism 20 by passing the fluid pressure from the fluid pressure medium supply 19 to the fluid pressure medium activated brakes 1 and 2 until at the outlet of the fluid pressure medium portion 21, a fluid pressure exists that corresponds to the activation force and/or to the activation travel distance. In the illustrated example, this fluid pressure medium is supplied directly to the fluid pressure medium activated brakes 1 and 2 as brake pressure. It can also be used, as shown in the embodiment in accordance with FIG. 2, for regulating the brake pressure by a relay valve. Also, other customary devices (e.g. brake force regulator, rapid release valve, etc.) can be incorporated into the pressure signal regulated brake circuit I. For simplicity, this brake circuit will be identified in the following description as the "fluid pressure regulated brake circuit I".

The electrically regulated brake circuit II consists of a fluid pressure medium supply 18, fluid pressure medium activated brakes 13 and 16, the electric portion 4 of the brake activation mechanism 20, electric brake value regulating devices 9, 10, 17, 14, and 15, a brake value sensor 3 associated with the fluid pressure regulated brake circuit I, and a comparison device 8.

The feed of the fluid pressure medium supplies 18 and 19 occurs in a known manner through a pressurization device, which is not shown.

The brake value sensor 3 is so designed that it measures the brake value of the fluid pressure medium activated brakes 1 and 2 and transforms it into a second electric brake value signal; that is, it acts as its generator, which will be discussed in detail below.

The input of a comparison device 8 is electrically connected to the electrical portion 4 of the brake activation mechanism 20 and to the brake value sensor 3. The output of the comparison device 8 is electrically connected to the input or one inputs of the brake value regulating devices 9, 10, 17, 14, and 15; that is, it is connected before it.

Each of the brake value regulating devices 9, 10, 17, 14, and 15 consists of regulating electronics 9, the input of which is electrically connected to the output of the comparison device 8, the electrically regulated fluid pressure modulators 10 and 17, and brake value sensors 14 and 15. The electrically regulated fluid pressure modulators 10 and 17 are electrically connected after the regulating electronics 9 and test respectively the connection of one of the fluid pressure medium activated brakes 13 and 16 to the fluid pressure medium supply 18. The brake value sensors 14 and 15 measure the brake value upon fluid pressure application to the respective fluid pressure medium activated brake 13 and 16 respectively, and supply a corresponding third electric brake value signal to the regulating electronics 9.

The comparison device 8 is so designed that it can pass through either the first electric brake value signal or the second electric brake value signal to its output that is electrically connected to the brake value regulating devices 9, 10, 17, 14 and 15. Instead of the instantaneous brake value signal itself, the comparison device 8 can also pass through an electrical signal that depends upon it; this possibility should be understood in the following without an explicit explanation.

The above-described basic design of the illustrated embodiment functions as follows.

Upon activation of the brake activation mechanism 20, it opens, for the purpose of generating the fluid pressure signal in its fluid pressure medium portion 21, a fluid communication connection between the fluid pressure medium supply 19 and the fluid pressure medium activated brakes 1 and 2. As a result of the fluid pressure feed, in the electrical portion 4 is established the first electric brake value signal, and at the fluid pressure medium activated brakes 1 and 2 is established a brake value that is measured by the brake value sensor 3 and is transformed to the second electric brake value signal. This second electric brake value signal as well as the first electric brake value signal are supplied to the comparison device 8. The comparison device 8, in a normal mode of operation, passes the second electric brake value signal through to the brake value regulating devices 9, 10, 17, 14, and 15 as a regulating signal; more accurately, to the regulating electronics 9.

Upon acquisition of this regulating signal, the regulating electronics 9 supplies to the fluid pressure modulators 10 and 17 an electrical signal or to each fluid pressure modulator 10 or 17 an individual signal that depends upon it; the fluid pressure modulators 10 and 17 pass then, up to the decay of this electrical signal, fluid pressure from the fluid pressure medium supply 18 as brake pressure to the fluid pressure medium activated brakes 13 and 16, at which thereupon establishes a brake value. A decay of the electrical signal occurs when the regulating electronics 9 determines equality between the third electric brake value signal and the regulating signal supplied to it by the comparison device 8. Thus, the brake value regulating devices 9, 10, 17, 14, and 15 forms a regulating circuit for the brake values of the fluid pressure medium activated brakes 13 and 16.

A brake value can be taken with respect to any suitable parameter that will characterize the instantaneous burdening of the fluid pressure medium activated brakes 1 and 2 or 13 and 16. Preferably considered as a brake value, are the brake moment (or the brake force) or the brake temperature, which the appropriate brakes generate or attain as a result of brake pressure application, and also the brake pressure itself. Correspondingly, the brake value sensors 3, 14 and 15 are designed as brake moment (brake force-) sensors, or temperature sensors, or pressure sensors.

In an exceptional mode of operation, the comparison device 8 passes through the first electric brake value signal (supplied by the brake activation mechanism 20) which then triggers the above-described effect in the electrically regulated brake circuit II. The exceptional mode of operation occurs mainly upon failure of the fluid pressure regulated brake circuit I. The electrically regulated brake circuit II, in this case, remains totally functional. On the other hand, the fluid pressure regulated brake circuit I also remains totally functional upon failure of the electrically regulated brake circuit II. However, it can occur that, as a result of tolerances, among others, the brake values in the two brake circuits I or II deviate from each other to a greater extent than in the normal mode of operation. Because the example considers only commercially available and low-cost devices and components, it embodies a high-quality multi-circuit brake mechanism that can be inexpensively manufactured.

Particularly from the function description, it follows that in the example a method is achieved for regulating at least one electrically regulated brake circuit II which is characterized by the brake value of the fluid pressure regulated brake circuit I being measured and the measured brake value then being transformed to a second electric brake value signal, and by the electrically regulated brake circuit II in the normal mode of operation being at least co-regulated by the second electric brake value signal and in the exceptional mode of operation being at least co-regulated by the first electric brake value signal. The aspect of "co-regulation" will be discussed later.

From the function description, it also follows that the electrically regulated brake circuit II follows the fluid pressure regulated brake circuit I. Although, because of its electric regulation, the potentially more rapid electrically regulated brake circuit II is slowed down by it, this is advantageous in favor of adjusting to the fluid pressure regulated brake circuit I, with the earlier mentioned advantage of pressure equality in the brake circuits I and II being ensured.

The basic embodiment described so far can be further developed in many ways, a few of which are indicated in FIG. 1 by dashed lines.

For example, 11 and 12 designate sensors that detect certain vehicle parameters and transform them to electric signals. These sensors 11 and 12 are electrically connected to the inputs of the regulating electronics 9. The regulating electronics 9, in this instance, is so designed that it forms a corrected signal or corrected signals from the regulating signal supplied by the comparison device 8 and the signals of the sensors 11 and 12 for the fluid pressure modulators 10 and 17, and turns it or them off when it determines equality between the third electric brake value signal (that originate in the brake value sensors 14 and 15) and the second of these corrected signal(s). The brake values that originate at the fluid pressure medium activated brakes 13 and 16 depend, in this case, not only on the regulating signal from the comparison device 8, but also on the vehicle parameters determined by the sensors 11 and 12. In other words, in this embodiment, the electrically regulated brake circuit II is "only" co-regulated by the second electric brake value signal (originating from brake value sensor 3) or, respectively, by the first electric brake value signal (originating from brake activation mechanism 20). In this context, any parameter relevant to the braking behavior of the vehicle is important. For example, to be considered are the load condition of the vehicle and/or the load condition of the axle(s) which are associated with the electrically regulated brake circuit II, the vehicle speed, the force in the coupling between tractor and trailer, etc.

The numeral 6 designates a device for the determination of the activation force and/or of its activation travel distance that is supplied of the brake activation mechanism 20. This device 6 is so designed that it issues a brake demand signal when it determines that a predetermined minimum limit of the activation force and/or of the activation travel distance is exceeded. The brake demand signal is supplied to the comparison device 8, which in this case is so designed that, upon receiving the brake demand signal, it passes the first electric brake value signal (originating from the brake activation mechanism 20) as the regulating signal. In this embodiment, the transition between the normal mode of operation and the exceptional mode of operation is determined by the magnitude of the activation force and/or the activation travel distance supplied by the brake activation mechanism 20.

The numeral 5 designates a device for the determination of the activation velocity of the brake activation mechanism 20, that can be provided instead of the device 6 or in addition to it. The device 5 is so designed that it issues a velocity signal when it determines that a predetermined minimum velocity is exceeded. The velocity signal is supplied to the comparison device 8 that, in this case, is so designed that upon receiving the velocity signal, it passes the first electric brake value signal. In this embodiment, the transition between the normal mode of operation and the exceptional mode of operation is determined by the magnitude of the activation velocity of the brake activation mechanism 20.

In a manner not shown, the comparison device 8 can also be so designed that it would compare the first electric brake value signal with the second electric brake value signal and upon determination of a predetermined impermissible deviation, it would issue a warning signal. Such an impermissible deviation can be due to flawed characteristics or functional defects of the brake value sensor 3 and/or of the electric portion 4 of the brake activation mechanism 20, but also due to failure of the fluid pressure regulated brake circuit I, in which case none or only an inadequate brake pressure would exist.

Should the comparison device 8 be designed to compare the first electric brake value signal with the second electric brake value signal, then, instead of as described above or in addition to it, it can be so designed that, upon the determination of a predetermined permissible deviation, it would pass the first electric brake value signal, that is, it would switch over to the exceptional mode of operation. Thereby, it is ensured that upon failure of the fluid pressure regulated brake circuit I, the electrically regulated brake circuit II would remain totally functional.

The numeral 7 designates an adjusting device for the first electric brake value signal, with the aid of which the first electric brake value signal can be adjusted completely or at least approximately to the second electric brake value signal when the comparison device 8 detects a deviation between the two electric brake value signals. The comparison device 8, in this case, is so designed that upon determination of a deviation between the electric brake value signals in the normal mode of operation, it issues a regulating signal to the adjusting device 7 which activates it in a known appropriate manner, and therefore is not described. Because this occurs only in a normal mode of operation, the adjusting device 7 can essentially or completely eliminate or adjust flawed characteristics or functional defects of the brake value sensor 3 or of the electric portion 4 of the brake activation mechanism 20, the effects of which lie below the discussed permissible deviation.

In a non-depicted manner, the above-described embodiment can be developed so that the comparison device 8 would issue the adjusting signal only when the detected deviation between the electric brake value signals reaches at least a predetermined tolerance value. This approach avoids an activation of the adjusting device 7 at any insignificant deviation, as well as increased cost for the adjusting device 7 or the comparison device 8.

In the embodiments of the example with the adjusting device 7 and device 5 for the determination of the activation velocity of the brake activation mechanism 20, the device 5 can be designed so that it would give a start-up signal as long as the activation velocity does not exceed a predetermined maximum value. The start-up signal is supplied to the comparison device 8 that, in this case, is so designed that it gives the adjusting signal (to the adjusting device 7) only when it determines simultaneously the deviation between the predetermined tolerance value and the permissible deviation and receives the start-up signal. This embodiment ensures that with an appropriate establishment of a maximum value (of the activation velocity of the brake activation mechanism 20) that the adjusting device 7 will be activated only at slow activation velocities of the brake activation mechanism 20 at which a synchronous action of rated pressure value and brake value is possible.

To reduce delays in the brake value progress of the electrically regulated brake circuit II in relation to the fluid pressure regulated brake circuit I in the described program regulation, it can be useful, already on the basis of the response of the first electric brake value signal, to modulate immediately a brake pressure approximately in the magnitude of the response pressure (or contact pressure) of the fluid pressure medium activated brakes 13 and 16 in an electrically regulated brake circuit II, and only then to permit the program regulation to act as described before.

Figure 2:
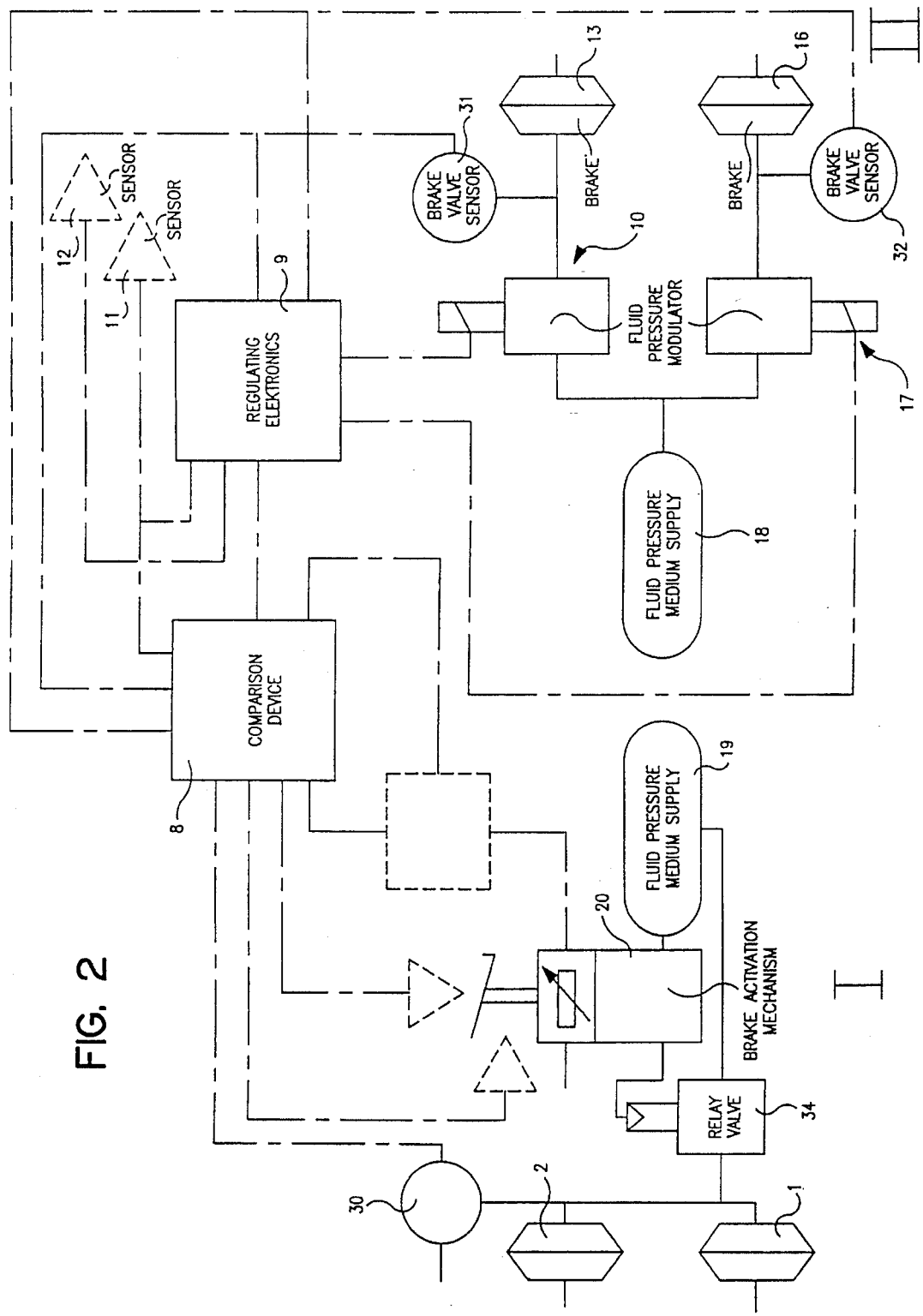
FIG. 2 is a schematic diagram which illustrates an alternative embodiment of a multi-circuit brake mechanism illustrated in FIG. 1.

In the alternative embodiment illustrated in FIG. 2, the brake pressure supplied to the fluid pressure medium activated brakes 1 and 2 or 13 and 16, respectively, serves as the brake value. Correspondingly, the brake value sensors identified as 30, 31, and 32 are designed as fluid pressure sensors. The brake value sensors 31 and 32 of the electrically regulated brake circuit II are depicted as separate structural groups, but they can also be integrated in the individually assigned fluid pressure modulator 10 or 17.

The brake value sensors 31 and 32 are connected in addition to the regulating electronics 9 and also to the comparison device 8.

The sensor 11 comprehends the load condition of the vehicle and/or the load condition of the axle or the several axles that are associated with the electrically regulated brake circuit II. The signal of the sensor 11, in the following called the "load signal", is supplied, in addition to the regulating electronics 9, also to the comparison device 8.

A performance curve is stored in the comparison device 8, which assigns to each load signal a rated deviation between the second electric brake value signal and the third electric brake value signal. The rated deviation can vary with the magnitude of a brake value signal or brake value signals. Furthermore, in a manner not depicted, the comparison device 8 is so designed that it issues a warning signal when it determines that the available ACTUAL deviation exceeds above or below the rated deviation that is assigned to the instantaneous load signal (and, if applicable, the magnitude of the brake value signal or signals) by at least a permissible tolerance value. With the permissible tolerance value, a response threshold is provided for giving the warning signal for the same reasons as offered above in conjunction with the adjusting signal. In an extreme case, this permissible tolerance value can be set at zero, thereby bringing about an immediate warning signal when any departure occurs above or below the rated deviation.

Based on its function, the embodiment in accordance with FIG. 2 provides a method for regulating at least one electrically regulated brake circuit II with which the brake value of the electrically regulated brake circuit II is measured and transformed to a third electric brake value signal, and a warning is issued upon exceeding above or below a load dependent rated deviation between the second electric brake value signal and the third electric brake value signal by at least a permissible tolerance value.

This example permits thereby a test of the brake value sensor 30 of the fluid pressure regulated brake circuit I by means of the brake value sensors 31 and 32 of the electrically regulated brake circuit II, and thereby provides a low-cost possibility to adjust the described multi-circuit brake mechanism to increased safety requirements.

The example in accordance with FIG. 2 also shows that in the fluid pressure regulated brake circuit I, the regulation of the brake pressure of the fluid pressure medium activated brakes 1 and 2 occurs through a relay valve 34 that receives the fluid pressure signal from the brake activation mechanism 20 as regulating pressure.

Otherwise, the example in accordance with FIG. 2 corresponds to that in accordance with FIG. 1.

Because in the examples an individual fluid pressure modulator 10 or 17 and an individual brake value sensor (14 or 15; 31 or 32) are assigned to each of the fluid pressure medium activated brakes 13 and 16, the brake value of each brake 13 or 16 can be individually regulated, if the regulating electronics 9 issues an individual signal for each fluid pressure modulator 10 or 17. By sacrificing braking comfort, the fluid pressure medium activated brakes 13 and 16, in a manner not shown, can be assigned only one pressure modulator and only one brake value sensor with corresponding simplification of the regulating electronics 9, thereby achieving a cost-effective design. The expert realizes that for such a simplified design, the above discussions correspondingly apply.

It is obvious that, in a manner not shown, the example can be expanded by one or several electrically regulated and/or pressure regulated brake circuits. The above discussions, regarding the construction of the electrically regulated brake circuit II as well as regarding its coupling to the fluid pressure regulated brake circuit I or to another pressure regulated brake circuit, apply correspondingly to the additional electrically regulated brake circuit(s).

The expert recognizes that the discussions given in relation to the individual examples also apply to the other example in a corresponding manner, as long as contradictions do not arise from these discussions.

It can be seen from the above description that the present invention avoids the disadvantage that, when a multi-circuit brake mechanism consisting of at least one electrically regulated brake circuit and at least one brake circuit that is regulated by the fluid pressure signal, the brake pressure buildup of the electrically regulated brake circuit would lead that of the pressure regulated brake circuit, thereby favoring nonuniform brake lining wear of the vehicle or, in the case of a vehicle combination, of another vehicle.

This invention offers the advantage that the fluid pressure signal of the brake circuit that is regulated by the fluid pressure signal can be supplied directly to the brakes as brake pressure. This offers the possibility of a very simple and low-cost design of this brake circuit. Should aspects that are independent of this invention, for example, to decrease the response time, require a course of action in this brake circuit, this invention offers also in this case an inexpensive approach; it permits the use of a conventional relay valve instead of one or several pressure modulators.

The invented system offers the advantage of a simple test of the characteristics and functions of a generator of the second electric brake value signal or of the electrical portion 4 of the brake activation mechanism 20 by comparing the first electric brake value signal generated by it with the second electric brake value signal. In a further development of this invention, an adjusting device can be provided that, in the case of a deviation in general or of a deviation above a predetermined tolerance limit, would adjust the first electric brake value signal at least substantially to the second electric brake value signal, and thereby would at least substantially eliminate or equalize possibly present flaws in the characteristics of the function disturbance of the said generator or the electric portion 4 of the brake activation mechanism 20.

In an application in which the brake pressure serves as the brake value and the multi-circuit brake mechanism exhibits a device for the determination of the loading condition of the vehicle and/or of the axle(s) that are associated with the electrically regulated brake circuit, this invention can be further developed to permit also a test of the brake value sensor of the fluid pressure regulated brake circuit that forms the basis for testing the electric portion 4 of the brake activation device 20. This approach to transform the brake value (brake pressure) of the electrically regulated brake circuit into a third electric brake value signal and to generate a load dependent deviation of those from the second electric brake value signal, offers a low-cost possibility to adapt the invention to increased safety requirements.

Although a number of embodiments of the method of and apparatus for regulating an electrically regulated brake circuit of a multi-circuit brake mechanism have been described in detail above, it should be obvious to those persons who are skilled in the vehicle braking art that various other modifications and adaptations of the present invention can be made without departing from the spirit and scope of the appended claims.

We claim:

1. A method of regulating at least one electrically regulated brake circuit that forms a portion of a multi-circuit brake mechanism, said multi-circuit brake mechanism includes a plurality of brakes which respond to and are activated by a predetermined fluid pressure medium, said method comprising the steps of:

(a) initiating a brake application by manipulating a brake activation mechanism;

(b) said brake application mechanism emitting at least one first electric brake value signal and at least one pressure signal when it is manipulated;

(c) communicating said pressure signal from said brake activation mechanism to a fluid pressure responsive brake circuit, a magnitude of said first electric brake value signal and of said pressure signal depends upon at least one of a force applied to said brake activation mechanism and a travel distance of at least one member of said brake activation mechanism in step (a);

(d) measuring a brake value produced by said fluid pressure responsive brake circuit;

(e) transforming said brake value measured in step (d) to a second electric brake value signal; and (f) at least regulating in part said electrically regulated brake circuit in a normal mode of operation by said second electric brake value signal and in an exceptional mode of operation by said first electric brake value signal.

2. A method of regulating an electrically regulated brake circuit, according to claim 1, wherein said brake value is a quantity that characterizes an instantaneous loading of said brakes of an associated brake circuit.

3. A method of regulating an electrically regulated brake circuit, according to claim 2, wherein said quantity that characterizes said instantaneous loading of said brakes is selected from the group consisting of at least of one of bake pressure, brake torque, brake temperature.

4. A method of regulating an electrically regulated brake circuit, according to claim 3, wherein said magnitude of said first electrical brake value signal depends upon said travel distance, and when said travel distance exceeds a predetermined minimum value said electrically regulated brake circuit is regulated in said exceptional mode of operation.

5. A method of regulating an electrically regulated brake circuit, according to claim 4, wherein said method includes the additional step of determining an activation velocity of said at least one member, and when said activation velocity exceeds a predetermined minimum value regulating said electrically regulated brake circuit in said exceptional mode of operation.

6. A method of regulating an electrically regulated brake circuit, according to claim 4, wherein said brake pressure is said quantity that characterizes said instantaneous burdening of said brakes and said method includes the additional steps of:

(a) determining a load condition of a vehicle equipped with said multi-circuit brake mechanism;

(b) measuring said brake value of said electrically regulated brake circuit;

(c) transforming said brake value of said electrically regulated brake circuit to a third electric brake value signal;

(d) comparing said second electric brake value signal with said third electric brake value signal; and (e) issuing a warning upon exceeding at least one of above and below a load dependent rated deviation between said second electric brake value signal and said third electric brake value signal by at least a permissible tolerance value.

7. A method of regulating an electrically regulated brake circuit, according to claim 3, wherein said method includes the additional step of operating said electrically regulated brake circuit at a start of said brake application in said exceptional mode of operation until a response pressure has built up in predetermined brakes.

8. A method of regulating an electrically regulated brake circuit, according to claim 7, wherein said method includes the additional step of determining an activation velocity of said at least one member, and when said activation velocity exceeds a predetermined minimum value regulating said electrically regulated brake circuit in said exceptional mode of operation.

9. A method of regulating an electrically regulated brake circuit, according to claim 7, wherein said brake pressure is said quantity that characterizes said instantaneous burdening of said brakes and said method includes the additional steps of:
(a) determining a load condition of a vehicle equipped with said multi-circuit brake mechanism;
(b) measuring said brake value of said electrically regulated brake circuit;
(c) transforming said brake value of said electrically regulated brake circuit to a third electric brake value signal;
(d) comparing said second electric brake value signal with said third electric brake value signal; and
(e) issuing a warning upon exceeding at least one of above and below a load dependent rated deviation between said second electric brake value signal and said third electric brake value signal by at least a permissible tolerance value.

10. A method of regulating an electrically regulated brake circuit, according to claim 3, wherein said brake pressure is said quantity that characterizes said instantaneous burdening of said brakes and said method includes the additional steps of:
(a) determining a load condition of a vehicle equipped with said multi-circuit brake mechanism;
(b) measuring said brake value of said electrically regulated brake circuit;
(c) transforming said brake value of said electrically regulated brake circuit to a third electric brake value signal;
(d) comparing said second electric brake value signal with said third electric brake value signal; and
(e) issuing a warning upon exceeding at least one of above and below a load dependent rated deviation between said second electric brake value signal and said third electric brake value signal by at least a permissible tolerance value.

11. A method of regulating an electrically regulated brake circuit, according to claim 10, wherein said load condition is determined on at least an axle associated with said electrically regulated brake circuit.

12. A method of regulating an electrically regulated brake circuit, according to claim 10, employing
(a) a brake value regulating device in said electrically regulated brake circuit;
(b) a brake value sensor on said fluid pressure responsive brake circuit for obtaining said second brake value signal;
(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it;
(d) a means to determine said load condition on one of said vehicle and at least one axle of said vehicle associated with said electrically regulated brake circuit;
(e) said means to determine said load condition being electrically connected to said comparison device;
(f) in said electrically regulated brake circuit there being positioned as brake value sensor at least one brake pressure sensor, said brake pressure sensor communicating said brake pressure dependent third electric brake value signal to said comparison device; and
(g) said comparison device receiving from a stored performance curve, depending on said load signal, a rated deviation between said second electric brake value signal and said third electric brake value signal and issuing a warning signal when an actual deviation lies one of above or below said rated deviation by at least a permissible tolerance value.

13. An apparatus for performing the method according to claim 10, comprising
(a) a brake value regulating device in said electrically regulated brake circuit;
(b) a brake value sensor on said fluid pressure responsive brake circuit for obtaining said second brake value signal;
(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it;
(d) a means to determine said load condition on one of said vehicle and at least one axle of said vehicle associated with said electrically regulated brake circuit;
(e) said means to determine said load condition being electrically connected to said comparison device;
(f) in said electrically regulated brake circuit there being positioned as brake value sensor at least one brake pressure sensor, said brake pressure sensor communicating said brake pressure dependent third electric brake value signal to said comparison device; and
(g) said comparison device receiving from a stored performance curve, depending on said load signal, a rated deviation between said second electric brake value signal and said third electric brake value signal and issuing a warning signal when an actual deviation lies one of above and below of said rated deviation by at least a permissible tolerance value.

14. A method of regulating an electrically regulated brake circuit, according to claim 1, wherein said magnitude of said first electrical brake value signal depends upon said force applied to said brake activation mechanism, and when said force exceeds a predetermined minimum value said electrically regulated brake circuit is regulated in said exceptional mode of operation.

15. A method of regulating an electrically regulated brake circuit, according to claim 14, wherein said method includes the additional step of determining an activation velocity of said at least one member, and when said activation velocity exceeds a predetermined minimum value regulating said electrically regulated brake circuit in said exceptional mode of operation.

16. A method of regulating an electrically regulated brake circuit, according to claim 14, wherein said brake pressure is said quantity that characterizes said instantaneous burdening of said brakes and said method includes the additional steps of:

(a) determining a load condition of a vehicle equipped with said multi-circuit brake mechanism;

(b) measuring said brake value of said electrically regulated brake circuit;

(c) transforming said brake value of said electrically regulated brake circuit to a third electric brake value signal;

(d) comparing said second electric brake value signal with said third electric brake value signal; and (e) issuing a warning upon exceeding at least one of above and below a load dependent rated deviation between said second electric brake value signal and said third electric brake value signal by at least a permissible tolerance value.

17. An apparatus for performing the method according to claim 14, comprising (a) a brake value regulating device in said electrically regulated brake circuit;

(b) a brake value sensor on said fluid pressure responsive brake circuit for obtaining said second brake value signal;

(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it; and (d) a device to recognize at least one of said activation force and said activation travel distance supplied to said brake activating mechanism, said device upon recognition of an instantaneous predetermined minimum value being exceeded, issuing a brake value demand signal which is communicated to said comparison device, said comparison device upon receiving said brake value demand signal, passing through one of said first electric brake value signal and, respectively, a signal that depends upon it.

18. A method of regulating an electrically regulated brake circuit, according to claim 1, wherein said method includes the additional step of determining an activation velocity of said at least one member, and when said activation velocity exceeds a predetermined minimum value regulating said electrically regulated brake circuit in said exceptional mode of operation.

19. A method of regulating an electrically regulated brake circuit, according to claim 18, wherein said brake pressure is said quantity that characterizes said instantaneous burdening of said brakes and said method includes the additional steps of:

(a) determining a load condition of a vehicle equipped with said multi-circuit brake mechanism;

(b) measuring said brake value of said electrically regulated brake circuit;

(c) transforming said brake value of said electrically regulated brake circuit to a third electric brake value signal;

(d) comparing said second electric brake value signal with said third electric brake value signal; and (e) issuing a warning upon exceeding at least one of above and below a load dependent rated deviation between said second electric brake value signal and said third electric brake value signal by at least a permissible tolerance value.

20. An apparatus for performing the method according to claim 18, comprising (a) a brake value regulating device in said electrically regulated brake circuit;

(b) a brake value sensor on said fluid pressure responsive brake circuit for obtaining said second brake value signal;

(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it; and (d) a device to recognize an activation velocity of said brake activating mechanism, said device upon recognition of a predetermined minimum value being exceeded, communicating a velocity signal to said comparison device, said comparison device upon receiving said velocity signal, passing through one of said first electric brake value signal and, respectively, a signal that depends upon it.

21. A method of regulating an electrically regulated brake circuit, according to claim 1, further including the step of determining a deviation between said first brake value signal and said second brake value signal.

22. An apparatus for performing the method according to claim 21, comprising (a) a brake value regulating device in said electrically regulated brake circuit;

(b) a brake value sensor on said fluid pressure responsive brake circuit for obtaining said second brake value signal;

(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it;

(d) an adjusting device for adjusting said first electric brake value signal; and (e) said comparison device further in said normal mode of operation upon a deviation between said first electric brake value signal and said second electric brake value signal communicating a regulating signal to said adjusting device for at least an approximate elimination of said deviation.

23. An apparatus for performing the method according to claim 21, comprising (a) a brake value regulating device in said electrically regulated brake circuit;

(b) a brake value sensor on said fluid pressure responsive brake circuit for obtaining said second brake value signal;

(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it;

(d) an adjusting device for adjusting said first electric brake value signal;

(e) a device to recognize an activation velocity of said brake activating mechanism, said device upon recognition of a predetermined maximum value not being exceeded, communicating a start-up signal to said comparison device; and (f) said comparison device further in said normal mode of operation upon said deviation between said first electric brake value signal and said second electric brake value signal and upon receipt of said start-up signal communicating a regulating signal to said adjusting device for at least an approximate elimination of said deviation.

24. A method of regulating an electrically regulated brake circuit, according to claim 21, further including the step of emitting a warning signal when said deviation reaches a predetermined impermissible value.

25. An apparatus for performing the method according to claim 24, comprising (a) a brake value regulating device in said electrically regulated brake circuit;

(b) a brake value sensor on said fluid pressure responsive brake circuit for obtaining said second brake value signal;

(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it;

(d) said comparison device being further adapted to communicate a warning signal upon said predetermined impermissible deviation between said first electric brake value signal and said second electric brake value signal.

26. A method of regulating an electrically regulated brake circuit, according to claim 21, further including the step of at least co-regulating said electrically regulated brake circuit in said exceptional mode when said deviation reaches a predetermined impermissible value.

27. An apparatus for performing the method according to claim 26, comprising (a) a brake value regulating device in said electrically regulated brake circuit;

(b) a brake value sensor on said fluid pressure responsive brake circuit for obtaining said second brake value signal;

(c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it; and (d) said comparison device further upon a predetermined impermissible deviation between said first electric brake value signal and said electric brake value signal passing through one of said first electric brake value signal and, respectively, a signal that depends upon it.

28. A method of regulating an electrically regulated brake circuit, according to claim 1, employing (a) a brake value regulating device in said electrically regulated brake circuit;

(b) a brake value sensor on said fluid pressure responsive brake circuit for obtaining said second brake value signal; and (c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it.

29. A method of regulating an electrically regulated brake circuit, according to claim 28, further employing a device to recognize at least one of said activation force and said activation travel distance supplied to said brake activating mechanism, said device upon recognition of a predetermined minimum value being exceeded, issuing a brake value demand signal which is communicated to said comparison device, said comparison device upon receiving said brake value demand signal, passing through one of said first electric brake value signal and, respectively, a signal that depends upon it.

30. A method of regulating an electrically regulated brake circuit, according to claim 28, further employing a device to recognize an activation velocity of said brake activating mechanism, said device upon recognition of a predetermined minimum value being exceeded, communicating a velocity signal to said comparison device, said comparison device upon receiving said velocity signal, passing through one of said first electric brake value signal and, respectively, a signal that depends upon it.

31. A method of regulating an electrically regulated brake circuit, according to claim 28, said comparison device being further adapted to communicate a warning signal upon said predetermined impermissible deviation between said first electric brake value signal and said second electric brake value signal.

32. A method of regulating an electrically regulated brake circuit, according to claim 28, said comparison device further upon a predetermined impermissible deviation between said first electric brake value signal and said electric brake value signal passing through one of said first electric brake value signal and, respectively, a signal that depends upon it.

33. A method of regulating an electrically regulated brake circuit, according to claim 28, further employing (a) an adjusting device for adjusting said first electric brake value signal; and (b) said comparison device further in said normal mode of operation upon a deviation between said first electric brake value signal and said second electric brake value signal communicating a regulating signal to said adjusting device for at least an approximate elimination of said deviation.

34. A method of regulating an electrically regulated brake circuit, according to claim 28, further employing (a) an adjusting device for adjusting said first electric brake value signal;

(b) a device to recognize an activation velocity of said brake activating mechanism, said device upon recognition of a predetermined maximum value not being exceeded, communicating a start-up signal to said comparison device; and (c) said comparison device further in said normal mode of operation upon a deviation between said first electric brake value signal and said second electric brake value signal and upon receipt of said start-up signal communicating a regulating signal to said adjusting device for at least an approximate elimination of said deviation.

35. An apparatus for performing the method according to claim 1, comprising (a) a brake value regulating device in said electrically regulated brake circuit;

(b) a brake value sensor on said fluid pressure responsive brake circuit for obtaining said second brake value signal; and (c) a comparison device electrically connected at an input thereof to receive said brake value signals and electrically connected at an output thereof to communicate a regulating signal to said brake value regulating device, said regulating signal in said normal mode of operation being said second electric brake value signal, and in said exceptional mode of operation said regulating signal being one of said first electric brake value signal and, respectively, a signal that depends upon it.

36. A method of regulating an electrically regulated brake circuit, according to claim 1, wherein said predetermined fluid pressure medium is selected from the group consisting of hydraulic and pneumatic.

* * * * *